No. 860,251. PATENTED JULY 16, 1907.
W. F. SCHMOELE.
MOTOR CYCLE.
APPLICATION FILED SEPT. 13, 1902.
2 SHEETS—SHEET 1.
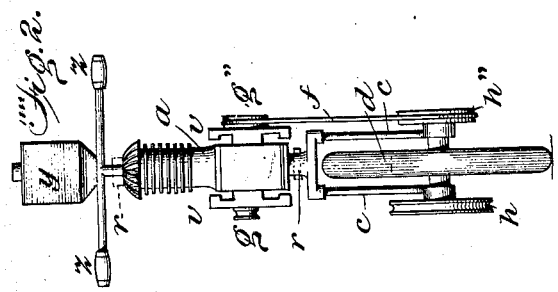
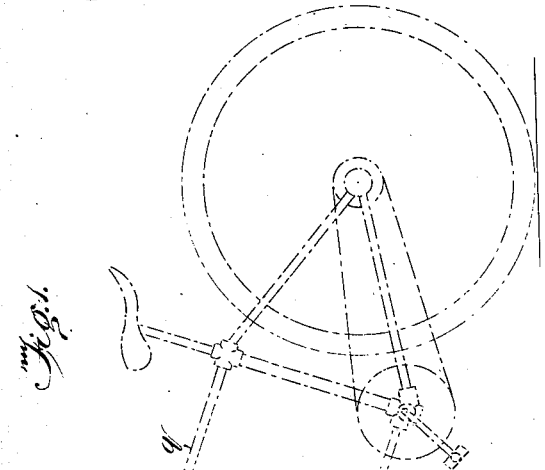
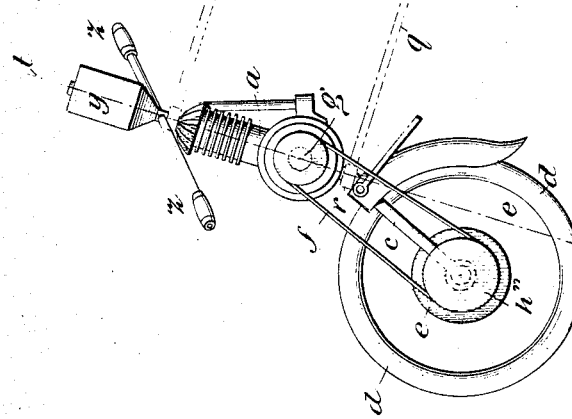
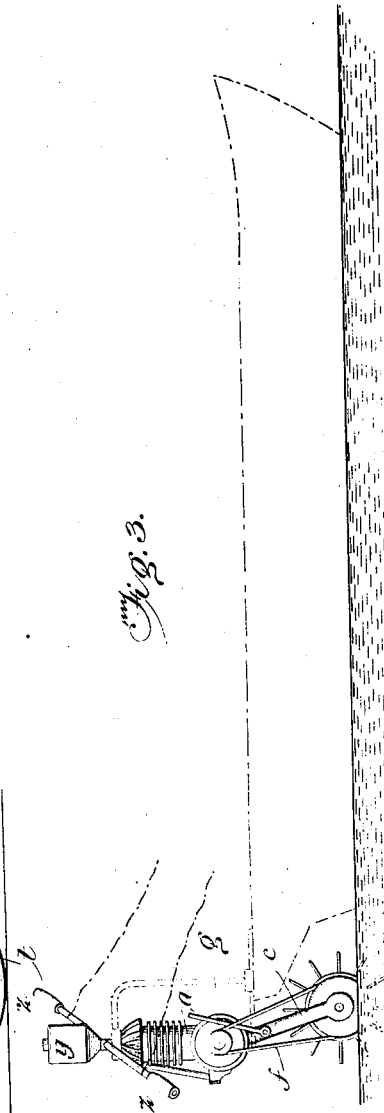
Witnesses:
Inventor:
Wm. F. Schmoele.

No. 860,251. PATENTED JULY 16, 1907.
W. F. SCHMOELE.
MOTOR CYCLE.
APPLICATION FILED SEPT. 13, 1902.

2 SHEETS—SHEET 2.

Witnesses:

Inventor
William Ford Schmoele

UNITED STATES PATENT OFFICE.

WILLIAM FORD SCHMOELE, OF PHILADELPHIA, PENNSYLVANIA, ASSIGNOR TO CHARLES SCHMOELE, OF PHILADELPHIA, PENNSYLVANIA.

MOTOR-CYCLE.

No. 860,251. Specification of Letters Patent. Patented July 16, 1907.

Application filed September 13, 1902. Serial No. 123,278.

*To all whom it may concern:*

Be it known that I, WILLIAM FORD SCHMOELE, of Philadelphia, Pennsylvania, at present dwelling in Antwerp, Belgium, have invented the new and useful Improvements in Motocycles hereinafter set forth.

My invention, called a moto-monocycle, consists of a column composed of a motor set upon a single ground wheel, and constitutes a steering or fore frame adaptable interchangeably to sundry non-motor drags or vehicles, to form at will either (1) a motor bicycle, or (2) a motor tricycle, this latter in many forms either for one person or for several, as a buggy, hansom cab or any other two-wheeled passenger vehicle, or for goods and loads of all kinds, as a cart. Again (3) to form a motor launch when hung to the stern of any small boat, which it both propels and steers; and finally (4) to constitute a stationary power plant on a small scale. Its compactness and wide kinetic range (6 powers) adapt it to all these uses, and it can be detached from any one of the above functions, and harnessed up to another, as quickly and as easily as a horse can be geared from one wagon to another, or to another service.

Figure 4:
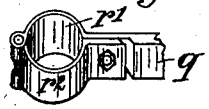
Figure 5:
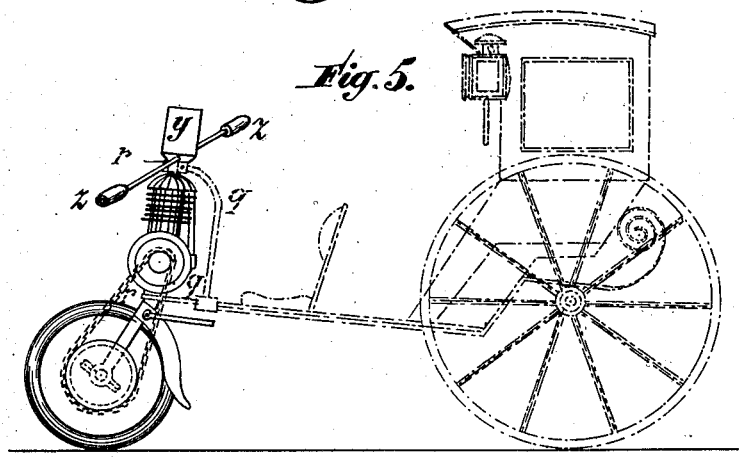
Figure 6:
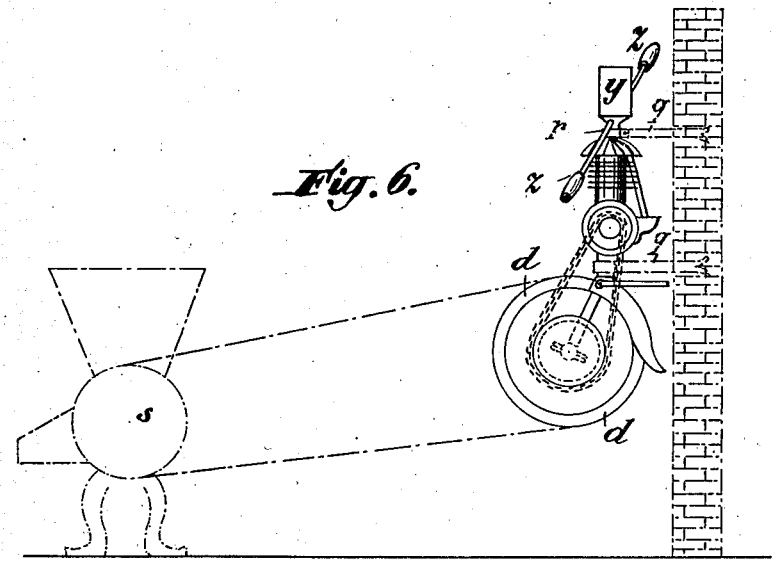

Figure 1 represents my moto-monocycle, shown in full lines, attached to a single-wheel drag in dotted and dashed lines, forming thus a motor bicycle. Fig. 2 is a front view. Fig. 3 shows the same monocycle applied to boat propelling and steering. Fig. 4 represents one of the collars in which it turns. Fig. 5 shows it geared to a hansom cab, with which it forms a tricycle. Instead of the cab, all kinds of two-wheeled vehicles can be substituted, such as buggies and carts, &c.; even cannon and ammunition caissons when the monocycle is made of larger size. Fig. 6 shows it hung up on a wall or post, as a stationary engine, for small power plants of all kinds.

My moto-monocycle consists of an explosion motor $a$, set upon a velocipede fork $c$, which holds the ground wheel $d$, preferably of a diameter smaller than usual in the fore-wheels of bicycles, in order to lower the center of gravity when used for draft. Around the axle of this wheel is lodged a change-speed gear hereinafter called a "speedalter," preferably constituted by a spur-wheel planetary train inclosed in an oil-tight box, and giving at least three speeds. Any other kind of speedalter can be used if compact and snugly housable within and around the hub of the ground wheel.

Reverse or backward motion is had without mechanism by swinging the whole monocycle around 180°.

The oil-tight box containing the speedalter, and represented in Fig. 1 by $e$, and in Fig. 2 by dotted lines, forms the hub of the ground wheel, and is held in the fork $c$. On its periphery several shells can be interchangeably fitted, each shell carrying different outer parts; to wit, spokes and a tire for traction on land Figs. 1 and 5, or to receive a belt, Fig. 6; paddle blades for boat propulsion Fig. 3; or sprocket teeth to receive a chain, Fig. 6.

To double the number of powers obtainable by the speedalter, it is made to undergo two régimes by bringing the motive power to it at different speeds by means of chain or belt gears $g\ h$ or $g''\ h''$ Fig. 2, so proportioned preferably that one and the same chain or belt $f$ will fit both pairs of gear interchangeably. Thus, for example, the power being brought in from the pulley $g''$ on the motor, to the pulley $h''$ on the speedalter at a velocity double that by which it would enter if the belt or chain were transferred to the other set of pulleys $g$ and $h$, a speedalter furnishing three speeds with the belt on $g$ or $h$, say 4, 12 and 16 miles an hour, would with the belt on $g''\ h''$ furnish three other speeds, 8, 24 and 32 miles an hour. Thus my motomonocycle can do heavy work at slow speeds, or light work at high speeds.

The motor may be of the ordinary 4 cycle type, and fired by hot-tube or by auto-incandescence. Better is a 2 cycle motor fired magneto-electrically by a magnet contained in the twin fly-wheel $v\ v$, which also acts as fan to the cylinder. To facilitate the steering, both the motor, $a$, and the fuel tank $y$, as well as the other belongings, should be so located that their center of gravity may fall well behind the pivot line $t\ t$ Fig. 1, whereby their weight will counterbalance that of the speedalter situated ahead of this line. The carbureter and the muffler should be chosen of compact form, and, with all their accessories, should be grouped into the column, which thus forms a complete and self-contained whole, to which any one- or two-wheeled drag may be hitched without any other connection than the yokes or collars $r$. These, shown in detail in Fig. 4 are simply two rings or circular openings, forming part of the ends of the frame $q$, which constitutes the bicycle drag Fig. 1, or is attached to the boat Fig. 3, or to the cab Fig. 5, or is sunk in the wall Fig. 6. These rings, preferably of a form, Fig. 4, to open by a hinge and to shut and lock by a bolt and nut, are at such distance from each other that one grasps the monocycle around its neck, just below the fuel tank $y$ and hand bars $z$, the other around its waist, just below the motor $a$ and above the fork $c$. Being free to turn in these collars, the monocycle can steer with ease, and can even turn 180° towards the side where the belt or chain is not, thus producing reverse motion. But it cannot tilt nor fall sidewise without overturning the vehicle or boat, both too heavy to be upset by such a light weight. When fastened to a wall, as in Fig. 6, the monocycle should be hindered from turning, by a clamp, or by jamming a bit of wood between each hand bar z and the wall.

I claim as my invention:

A motor column composed of a single ground-wheel with speedalter hub, and having differential pulleys and a chain or belt transposable by hand, to gear said hub to an explosion motor, mounted behind the center of gravity of the column upon a fork holding the ground wheel; the whole rotatable in two collars, one above and one below the motor, by ordinary bicycle handbars, these collars forming part of the vehicle, boat or fixed post to which the motor column is temporarily attached, substantially as described.

WILLIAM FORD SCHMOELE.

Witnesses:
H. MARSIL.
FERD. W. C. WALKENS.